US006578350B2

United States Patent
Blase et al.

(10) Patent No.: US 6,578,350 B2
(45) Date of Patent: Jun. 17, 2003

(54) ENERGY GUIDING CHAIN

(75) Inventors: Frank Blase, Bergisch Gladbach (DE); Dirk Mönikes, Köln (DE)

(73) Assignee: Igus Spritzgussteile für die Industrie GmbH, Köln (DE)

( * ) Notice: Subject to any disclaimer, the term of this patent is extended or adjusted under 35 U.S.C. 154(b) by 0 days.

(21) Appl. No.: 10/045,716

(22) Filed: Oct. 19, 2001

(65) Prior Publication Data

US 2002/0108365 A1 Aug. 15, 2002

Related U.S. Application Data

(63) Continuation of application No. PCT/DE00/01137, filed on Apr. 13, 2000.

(30) Foreign Application Priority Data

| Apr. 19, 1999 | (DE) | 199 19 075 |
| Apr. 19, 1999 | (DE) | 299 07 446 U |
| Apr. 19, 1999 | (DE) | 299 07 447 U |

(51) Int. Cl.[7] ............................................. F16G 13/00
(52) U.S. Cl. ................................... 59/78.1; 248/49
(58) Field of Search ............................ 59/78.1; 249/49, 249/51

(56) References Cited

U.S. PATENT DOCUMENTS

| 4,373,324 A | * | 2/1983 | Janos | 59/78.1 |
| 4,852,342 A | * | 8/1989 | Hart | 248/49 |
| 5,220,779 A | | 6/1993 | Tatsuta et al. | |
| 5,642,612 A | * | 7/1997 | Hughes | 248/49 |
| 5,829,243 A | | 11/1998 | Hughes | |
| 5,839,476 A | | 11/1998 | Blase | |
| 5,890,357 A | | 4/1999 | Blase | |
| 6,374,589 B1 | * | 4/2002 | Kunert et al. | 249/49 |

FOREIGN PATENT DOCUMENTS

| DE | 42 22 758 A1 | 1/1993 | |
| DE | 94 09 082 U1 | 11/1995 | |
| DE | 196 17 900 A1 | 12/1996 | |
| DE | 197 16 695 C1 | 12/1998 | |
| DE | 299 07 446 U1 | 9/1999 | |
| DE | 299 07 447 U1 | 9/1999 | |
| GB | 2111634 | * 6/1983 | 59/78.1 |

* cited by examiner

*Primary Examiner*—David Jones
(74) *Attorney, Agent, or Firm*—Akin, Gump, Strauss, Hauer & Feld, L.L.P.

(57) ABSTRACT

An energy guiding chain comprises chain links that are open at the end face and connected to one another in articulated fashion, each of which comprises two side elements connected by at least one cross-member and has a connector in the areas adjacent to the end faces for articulated connection to a chain link adjacent to the end face about an axis transverse to the longitudinal direction of the chain. In order to simplify the insertion of, and access to, the lines inside the chain, at least one chain link is provided, whose side elements are connected by a cross-member (center web) located roughly in the middle and which have openable cross-members (outside webs) on the outside.

17 Claims, 6 Drawing Sheets

ENERGY GUIDING CHAIN

CROSS-REFERENCE TO RELATED APPLICATION

This application is a continuation of International Application No. PCT/DE00/01137, filed Apr. 13, 2000, the disclosure of which is incorporated herein by reference.

BACKGROUND OF THE INVENTION

The invention relates to an energy guiding chain comprising chain links that are open at the front and connected to one another in articulated fashion, each of which comprises two side elements, whereby at least one chain link comprises a first connector at its side elements for articulated connection to a chain link adjacent to a front side of said link about a first axis transverse to the longitudinal direction of the chain, and a second connector for articulated connection to a chain link adjacent to the other front side about a second axis perpendicular to the first axis and transverse to the longitudinal direction of the chain.

Energy guiding chains of this kind are known, for example, from U.S. Pat. No. 5,839,476. The chains described in this document consist of chain links with a U-shaped cross-section, the open side walls of which can be opened and closed with the help of covers, where the covers of all chain links are located on one and the same side of the energy guiding chain. After opening the covers, the lines can easily be inserted or removed on the respective side of the energy guiding chain.

At least one section of the known energy guiding chain consists of two different, alternating basic types of chain link. The first basic type has openings on its side elements for articulated connection to the adjacent second basic type on one front side and pins on the cover and on the wall opposite the cover for articulated connection to the adjacent second basic type on the other front side. Accordingly, the second basic type has pins on its side elements which engage the openings in the first basic type and openings on its cover and the wall opposite the cover which are engaged by the pins of the first basic type.

Due to the U-shaped profile of the chain links of the known energy guiding chain, several layers of lines are usually arranged between the cover and the opposite wall. Thus, the lines adjacent to the wall opposite the cover are not easily accessible and can only be extracted after removing the lines above them.

BRIEF SUMMARY OF THE INVENTION

The object of the invention is to simplify access to the lines inside an energy guiding chain of the type described at the beginning.

According to the invention, the object is solved by an energy guiding chain comprising chain links open at an end face connected to one another in articulated fashion, each of which links comprises two side elements, wherein at least one chain link comprises a first connector at its side elements for articulated connection to a chain link adjacent to the end face of said link about a first axis transverse to a longitudinal direction of the chain, the side elements of the link being connected by a center web and having openable outside webs, the center web comprising a second connector for articulated connection to a chain link adjacent to another end face about a second axis perpendicular to the first axis and transverse to the longitudinal direction of the chain, and other chain links having respective center webs and respective openable outside webs, where the respective openable outside webs are located on the same opposite sides of the chain.

As a result of the design according to the invention, the lines inside the energy guiding chain are arranged in two areas that are only roughly half as deep as on the known energy guiding chains and each of which extends from the center web to one of the two outside webs. As a result of the openable outside webs, the lines in these areas are easier to access and can thus be removed without extensively manipulating the other lines.

Moreover, connection of the side elements by means of center webs has proven to increase stability compared to a chain with a U-shaped cross-section, this being particularly advantageous when the chain is subject to major manipulation when inserting or removing the lines.

The outside webs of the chain links can have any number of designs that permit the respective side of the energy guiding chain to be opened far enough to allow lines to be inserted into and removed from the areas between the center web and the outside webs. For example, at least one end of the outside webs can be connected to the side elements in detachable fashion. In another configuration, the outside webs can be mounted on the side elements such that they can be swung open.

In a particularly simple configuration, the outside webs can be integrally molded on the side elements and have openings roughly in the middle, so that they can be opened by bending. In this case, the outside straps have web segments that are each integrally molded on the side elements, whose ends can overlap, for example. The web segments can be at the same height in this context, where the end of one web segment can extend underneath the end of the other web segment via a stepped recess. The web segments can also be at different heights.

The opening that separates the two web segments from one another preferably runs in the longitudinal direction of the chain and is as narrow as possible, so that the lines can easily be inserted or removed by bending the ends of the web segments away from one another, perpendicular to the longitudinal direction of the chain.

In a preferred configuration of the invention, the side elements of the chain link are of cranked design, each having an inwardly cranked strap section and an outwardly cranked strap section. The openable outside webs expediently extend between the outwardly cranked strap sections of the opposite side elements of the chain link.

In one embodiment of a chain link of this kind, the center web extends between the inwardly cranked strap sections of the opposite side elements, where the first connector is located on the outwardly cranked strap sections.

In this context, the first connector can comprise openings in the outwardly cranked strap sections and the second connector of a pin integrally molded on the center web.

In another embodiment, the center web extends between the outwardly cranked strap sections of the opposite side elements of the chain link, where the first connector is located on the inwardly cranked strap sections.

In this context, the first connector can comprise pins integrally molded on the strap sections that extend from inside the chain towards the outside, and the second connector of an opening provided in the center web.

In particular, the energy guiding chain according to the invention can have at least one first chain link according to the first embodiment described above, and at least one second chain link according to the second embodiment described above, the front sides of which can be connected to one another in articulated fashion. This means that the first and second connectors of the two chain links are each designed such that, when the two chain links are properly assembled, they form an articulated connection about the first or second axis.

By connecting at least one first and one second chain link in the chain, the range of curvature of the chain can be increased in the three spatial dimensions. If several first and second chain links are connected in alternating fashion, it is possible to make the curvature of the chain longer and tighter in this area.

The side elements of the first and second chain links can be designed such that, no matter how the two chain links are connected in order to pivot about the first or second axis, the respective sides of the energy guiding chain are essentially closed in every pivoting position. In this context, the outwardly cranked strap sections can overlap the inwardly cranked strap sections of the respectively adjacent side element.

In a preferred configuration, the inwardly cranked strap sections of the second chain link have projections on the end faces facing in the longitudinal direction of the chain, which engage pockets in the first chain link when the two chain links are connected to form a pivoting connection about the first axis, the pockets being located on the sides of the outwardly cranked strap sections facing the inside of the chain and opposite the inwardly cranked strap sections.

The projections of the second chain link that engage the pockets located on the inside of the side elements of the first chain link increase the stability of the articulated connection between adjacent chain links when exposed to forces acting transverse to the longitudinal direction of the chain. Furthermore, the projections can be designed as stops, which interact with corresponding stop surfaces on the inside of the pockets, in order to limit the pivoting angle in both pivoting directions about the first axis.

In another configuration, the inwardly cranked strap sections of the first chain link can have slots on one side of the center web on the end faces facing in the longitudinal direction of the chain, the purpose of which is to engage the center web of the second chain link, and the center web of the second chain link can have a slot adjacent to a side element to engage the respective end face of the adjacent side element of the first chain link, where the slots are designed such that they define limiting angles for pivoting in both directions about the second axis.

The energy guiding chain according to the invention can comprise a third chain link, the center web of which has a connector in each of the areas adjacent to its end faces for articulated connection to a chain link adjacent to the respective end face about an axis perpendicular to the center web.

Under certain circumstances, it is desirable to arrange chain links in at least some sections of an energy guiding chain, which can pivot relative to one another about axes perpendicular to the center web. In these sections, the energy guiding chain can only bend in the plane perpendicular to the pivoting axes. Between these sections, the energy guiding chain can have other sections in which the chain links pivot as usual about axes perpendicular to the side elements. On the whole, this results in a chain that can move in articulated fashion in all three spatial dimensions, where the degree of curvature in a particular plane is defined by the number of chain links in an intermediate section that have pivoting axes not lying in this plane. Depending on the desired bending behavior of the chain, it can be made up of suitable sections of chain links that can pivot in different planes. The lines guided by the energy guiding chain between a stationary base and a moving consumer can thus be protected against excessive bending forces.

As a result of its construction, the third chain link can be connected to an adjacent chain link in particularly simple fashion, without requiring complicated connectors for pivoting about axes parallel to the side elements.

The third chain link can also be used as an extension link in an energy guiding chain with the first and second chain links described above, which enables the chain to bend in all three spatial dimensions. If the chain is extended by one or more of these chain links, the respective section of the chain can be designed to bend exclusively about parallel axes that are perpendicular to the center webs. In this way, the chain can be better adapted to specific, desired patterns of curvature.

The center web of this chain link is preferably of cranked design, with a first web segment cranked to one side and a second web segment cranked to the other side, where the first web segment has an opening as a connector and the second web segment has a pin as a connector, which is integrally molded on the side of the second web segment towards which the first web segment is cranked.

In addition, the side elements of the third chain link can be of cranked design and the section of the chain link in the longitudinal direction of the chain with outwardly cranked strap sections can be designed like that of the second chain link and the section with the inwardly cranked strap sections can be designed like that of the first chain link described above.

The energy guiding chain according to the invention can include a fourth chain link, the areas adjacent to the end faces of the side elements of which each have a connector for articulated connection to a chain link adjacent to the respective end face about an axis transverse to the longitudinal direction of the chain and parallel to the center web.

Such fourth chain links can also be used as extenders of an energy guiding chain made up of the first and second chain links described above. With this kind of extension, the respective section of the chain can be designed to pivot exclusively about axes parallel to the center web. This makes it possible to optimally adapt the chain to specific, desired patterns of curvature.

In a preferred configuration, the side elements of the fourth chain link are of cranked design and the section of the chain link in the longitudinal direction of the chain with outwardly cranked strap sections can be designed like that of the first chain link and the section with the inwardly cranked strap sections can be designed like that of the second chain link.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

DETAILED DESCRIPTION OF THE INVENTION

Figure 1:
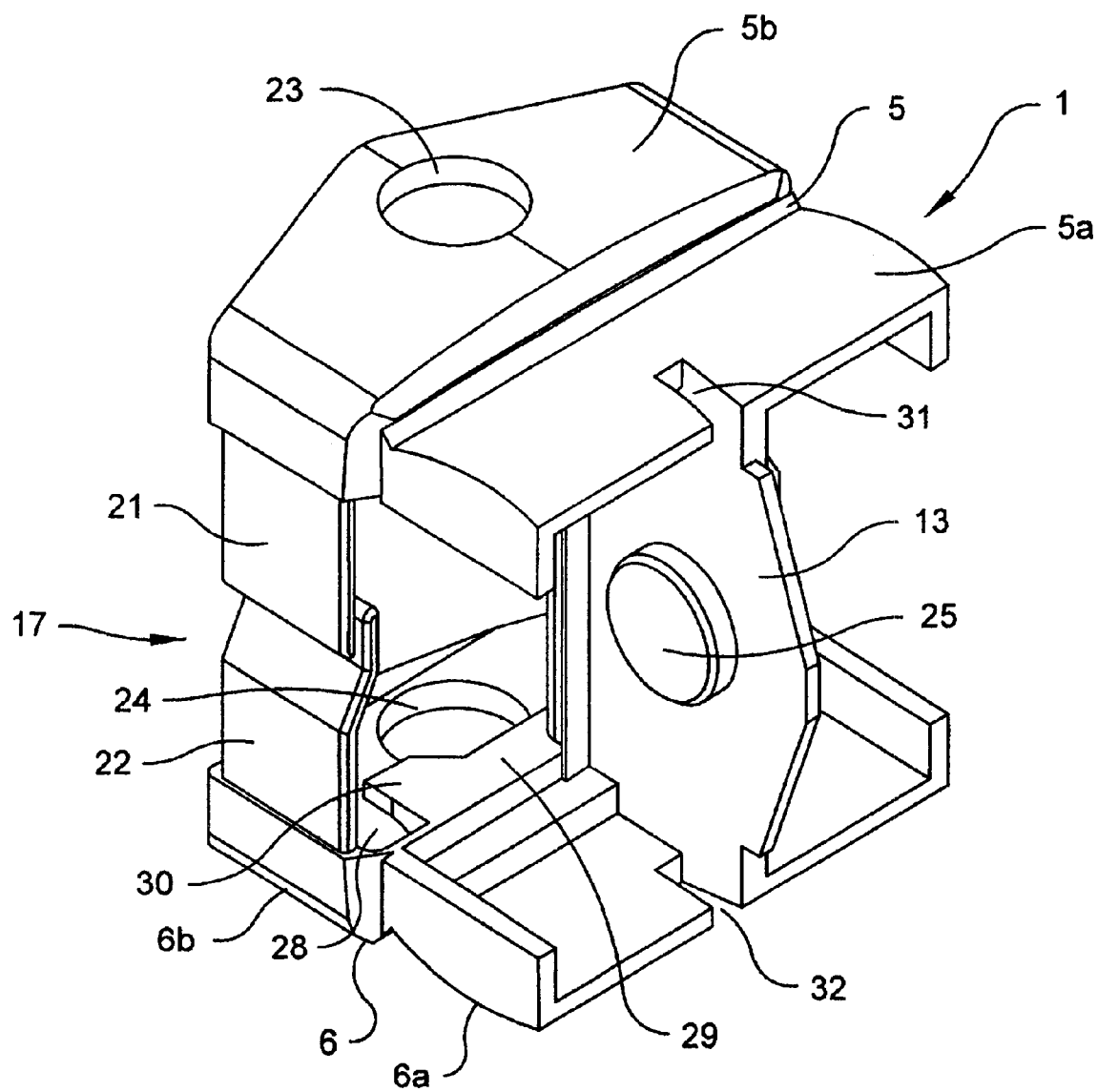
FIG. 1 is a perspective view of a first chain link according to the invention.

Chain links 1, 2, 3 and 4 shown in the drawing each have two side elements 5, 6; 7, 8; 9, 10 and 11, 12 connected by a center web 13, 14, 15 and 16 located roughly in the middle. Openable outside webs 17, 18, 19 and 20 are further provided on the outside of the side elements.

The areas of chain links 1, 2, 3 and 4 facing the open end faces are equipped with connectors for articulated connection to chain links adjacent to the end faces about pivoting axes perpendicular to the longitudinal direction of the chain.

Outside webs 17, 18, 19 and 20 comprise web segments 21 and 22, integrally molded on opposite side elements, between whose free ends there is a gap. The end of the one web segment 22 is bent towards the inside of the chain in stepped fashion and reaches underneath the end of the other web segment 21. As a result of the elasticity of the plastic material used to injection mold the complete chain links 1, 2, 3 and 4 in one piece, the ends can be bent away from one another in order to insert or remove lines in the chain links.

Figure 2:
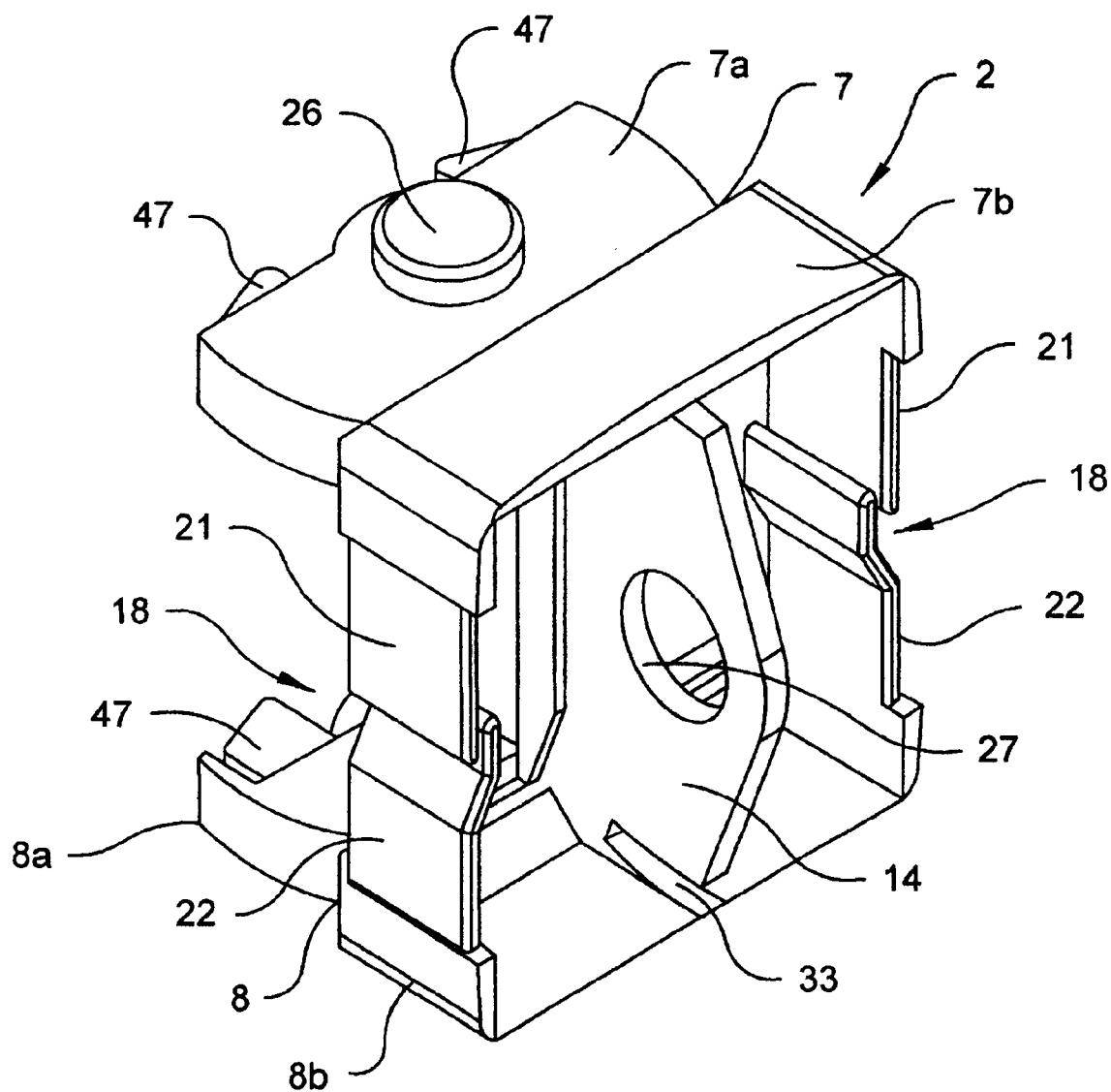
FIG. 2 is a perspective view of a second chain link.

In chain links 1 and 2, shown in FIGS. 1 and 2, side elements 5, 6 or 7, 8 have first connectors for articulated connection to the chain link adjacent to the respective end face about a first axis running transverse to the longitudinal direction of the chain and parallel to center web 13 or 14. Center webs 13 and 14 are provided with second connectors for articulated connection to the chain link adjacent to the other end face about a second axis perpendicular to the first axis and transverse to the longitudinal direction of the chain.

In chain link 1, shown in FIG. 1, the first connectors comprise openings 23 and 24 in side elements 5 and 6, while the second connector is a pin 25 provided on one side of center web 13.

In chain link 2, shown in FIG. 2, the first connectors comprise pins 26 on the outside of side elements 7 and 8 and the second connectors of an opening 27 provided in center web 14.

As can be seen in FIGS. 1 and 2, side elements 5, 6 and 7, 8 of chain links 1 and 2 are of cranked design, each having an inwardly cranked strap section 5a, 6a and 7a, 8a and an outwardly cranked strap section 5b, 6b and 7b, 8b. Openable outside webs 17 and 18 extend between outwardly cranked strap sections 5b, 6b and 7b, 8b.

Within the first chain link 1 shown in FIG. 1, center web 13 extends between inwardly cranked straps sections 5a and 6a, where openings 23 and 24 that form the first connector are located in outwardly cranked strap sections 5b and 6b.

The embodiment according to FIG. 2 shows the complementary arrangement. Here, center web 14 extends between outwardly cranked strap sections 7b and 8b, where pins 26 that form the first connector are located on inwardly cranked strap sections 7a and 8a.

The connectors of chain links 1 and 2, which comprise openings 23, 24 and 27 and pins 25 and 26, are designed such that, given proper assembly of the two chain links 1 and 2, they form an articulated connection about the first or second pivoting axis.

Side elements 5, 6 and 7, 8 of chain links 1 and 2 are designed such that, no matter how the two chain links 1 and 2 are connected in order to pivot about the first and second axes, the respective sides of the chain are essentially closed in every pivoting position. In this context, outwardly cranked strap sections 5b, 6b and 7b, 8b overlap inwardly cranked strap sections 5a, 6a and 7a, 8a.

As shown in FIG. 2, the end faces of inwardly cranked strap sections 71 and 8a of the second chain link 1 facing in the longitudinal direction of the chain are provided with projections 47. When connecting this end face of the second chain link 2 to the first chain link 1 in order to form a pivoting connection about the first axis, projections 47 engage pockets 28 of the first chain link 1 which, as shown in FIG. 1, are located on the sides of outwardly cranked strap sections 5b and 6b facing the inside of the chain and opposite inwardly cranked straps sections 5a, 6a. The projections 47 are designed as stops, which interact with stop surfaces on the inside of pocket 28 in order to limit the pivoting angles in both pivoting directions about the first axis.

The pockets 28 are formed by webs 29 located at a distance from, and parallel to, outwardly cranked strap sections 5b and 6b. Guide tabs 30 are provided in the areas of webs 29 in which projections 47 of the second chain link 2 reach underneath webs 29, in order to more easily guide projections 47 during assembly of the first and second chain links 1 and 2.

As shown in FIG. 1, the end faces of inwardly cranked strap sections 5a and 6a of chain link 1 facing in the longitudinal direction of the chain have slots 31 and 32 on one side of center web 13, the purpose of which is to engage center web 14 of an adjacent chain link 2. Center web 14 of chain link 2 is also provided with a slot 33 adjacent to side element 8 that engages the end face of the respective side element 6 of chain link 1. Slots 31, 32 and 33 are designed such that they define limiting angles for the pivoting of the two chain links 1 and 2 in both directions about the second axis.

Figure 3:
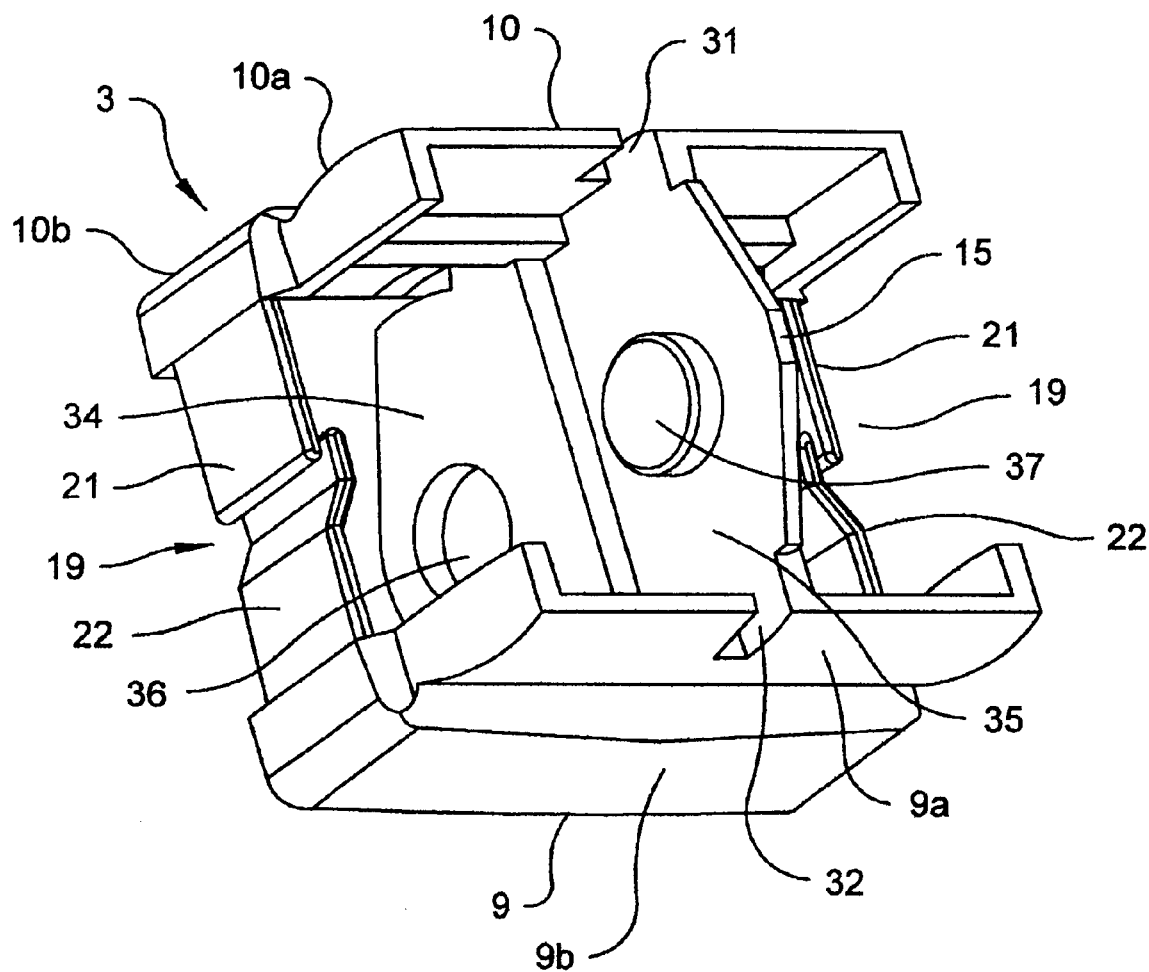
FIG. 3 is a perspective view of a third chain link.

FIG. 3 shows a third chain link 3, which can be used together with chain links 1 and/or 2 in an energy guiding chain. Center web 15 of this chain link has a connector in each of the areas adjacent to its end faces for articulated connection to a chain link adjacent to the respective end face about an axis perpendicular to center web 15.

As shown in FIG. 3, center web 15 of chain link 3 is of cranked design, with a first web segment 34 cranked to one side and a second web segment 35 cranked to the other side. First web segment 34 has an opening 36 as a connector and second web segment 35 has a pin 37 as a connector, which is integrally molded on the side of second web segment 35 towards which first web segment 34 is cranked.

Side elements 9 and 10 of chain link 3 are also of cranked design, where the section of chain link 3 in the longitudinal direction of the chain with outwardly cranked strap sections 9b and 10b is designed like that of second chain link 2. The section of chain link 3 with inwardly cranked strap sections 9a, 10a is designed like that of chain link 1.

Figure 4:
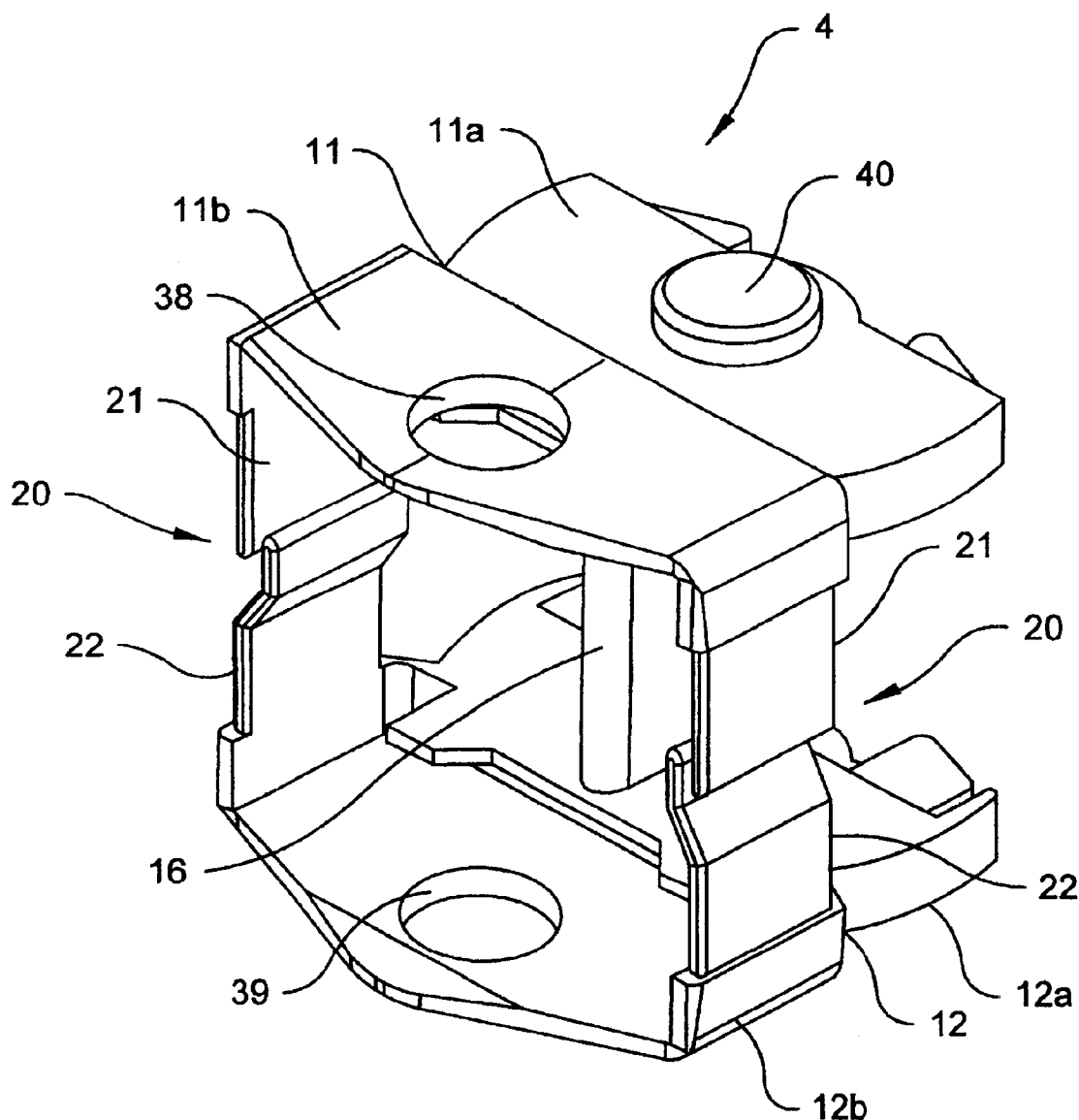
FIG. 4 is a perspective view of a fourth chain link.

FIG. 4 shows a fourth chain link 4, which can be used together with chain links 1 and/or 2 and, optionally also 3 described above in an energy guiding chain.

The areas adjacent to the end faces of side elements 11 and 12 of this chain link each have a connector for articulated connection to a chain link adjacent to the respective end face about an axis transverse to the longitudinal direction of the chain and parallel to center web 16. Side elements 11 and 12 are also of cranked design, where outwardly cranked strap sections 11b and 12b have openings 38, 39 as connectors and inwardly cranked strap sections 11a and 12a have pins 40 facing the outside.

The section of chain link 4 in the longitudinal direction with outwardly cranked strap sections 11b and 12b is designed like that of chain link 1, while the section with inwardly cranked strap sections 11a and 12 is designed like that of chain link 2.

As a result of the identical design of the respective sections of chain links 1, 2, 3 and 4, they can be assembled in any desired combination to form chain sections that, in turn, form a homogeneous structure.

Figure 5:
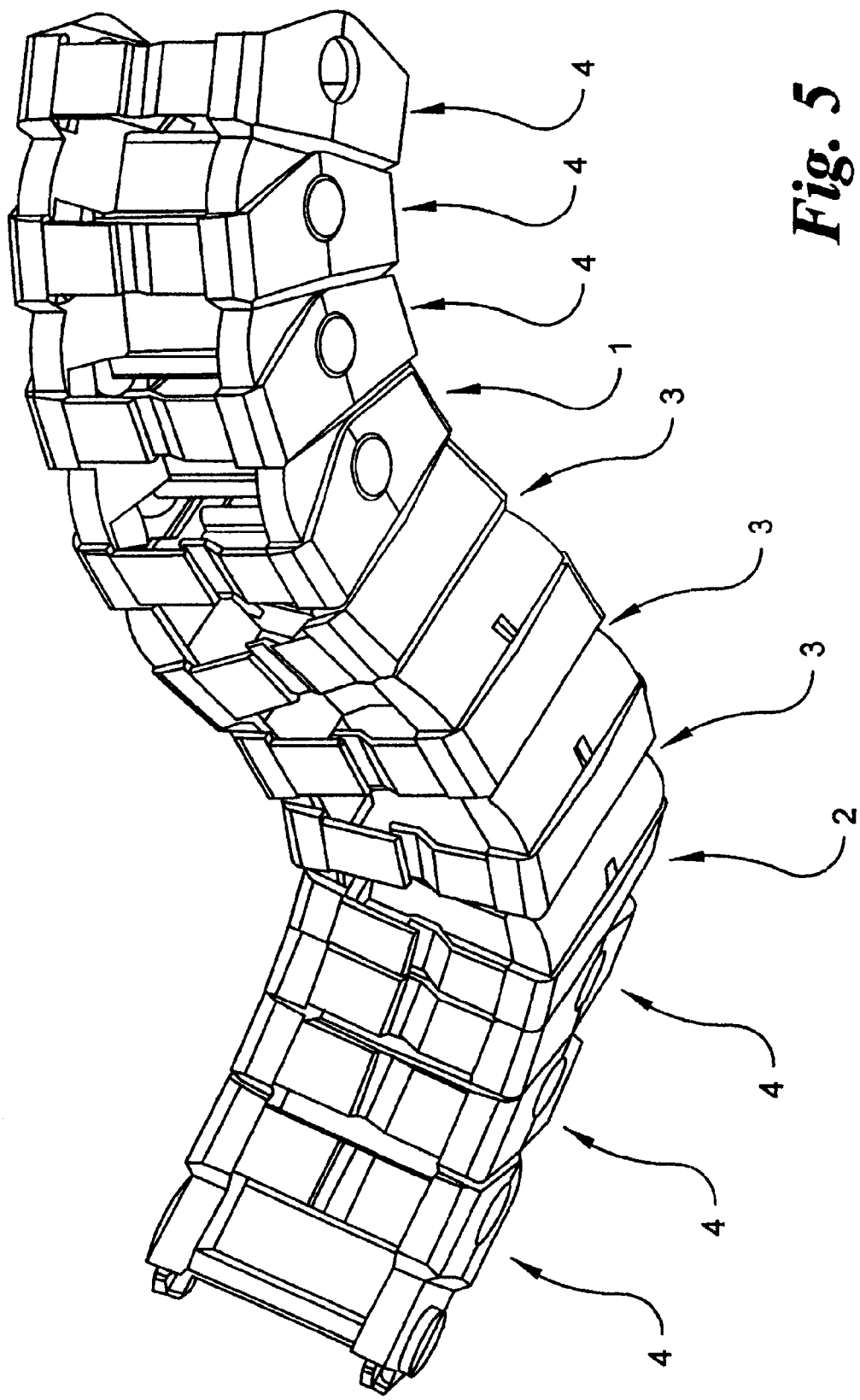
FIG. 5 is a perspective view of a section of an energy guiding chain containing the chain links according to FIGS. 1 to 4.
Figure 6:
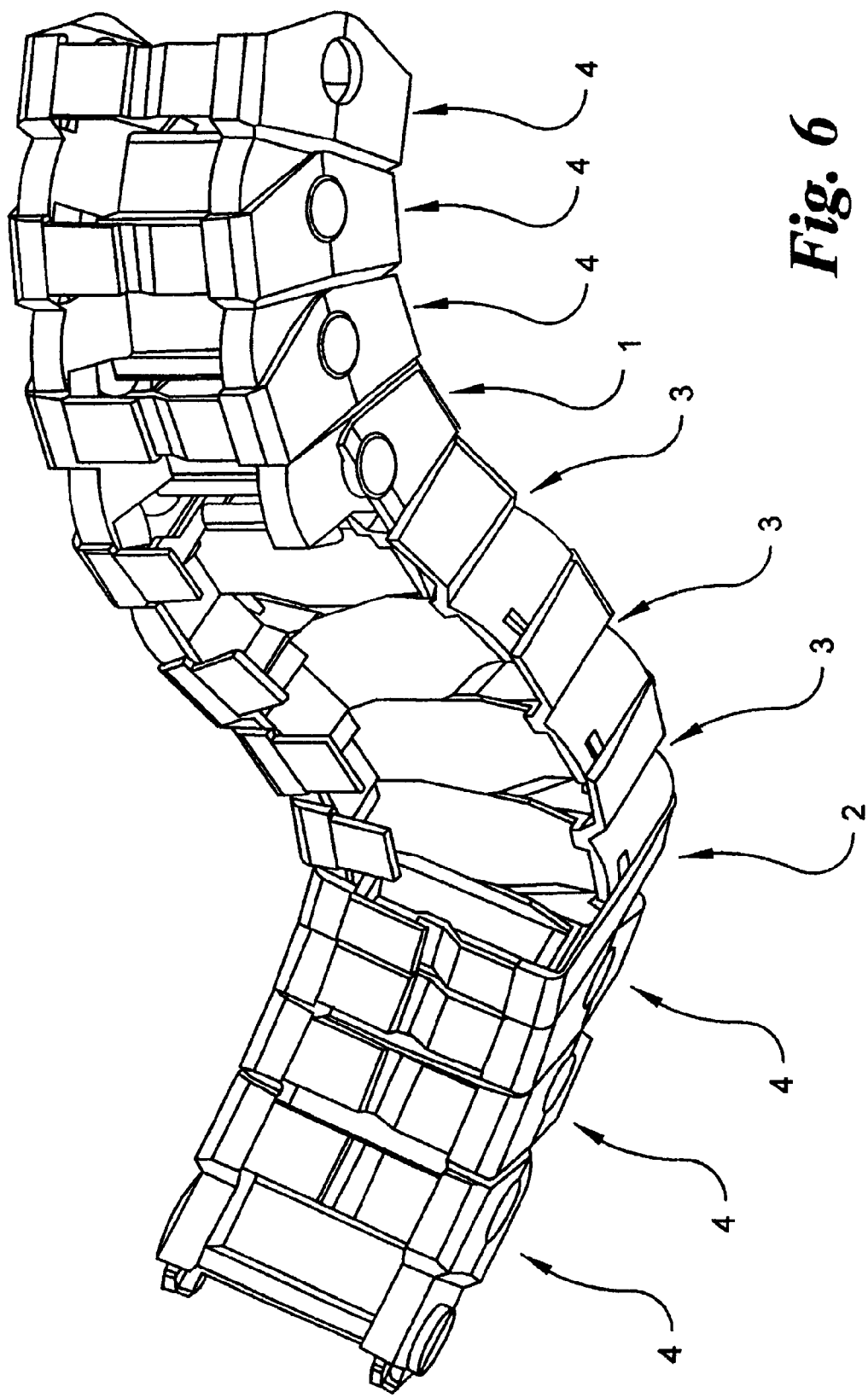
FIG. 6 is a partially cut-away view of the chain section according to FIG. 5.

FIGS. 5 and 6 show a length of chain made up of sections of this kind. It essentially comprises three sections made up as follows: the section shown on the left of FIGS. 5 and 6 comprises three chain links 4, which can pivot about parallel axes. The chain can bend in one plane in this section.

The middle section shown in FIGS. 5 and 6 comprises three chain links 3, which can pivot relative to one another about axes perpendicular to the axes of chain links 4 and parallel to each other. The transition between the two sections is formed by one chain link 2, which is connected to adjacent chain links 3 and 4 such that pin 37 on center web 15 of chain link 3 engages opening 27 in center web 14 of chain link 2 and pins 26 on side elements 7 and 8 of chain link 2 engage openings 38 and 39 in side elements 11 and 12 of chain link 4.

The section of the chain shown on the right in FIG. 6 again comprises chain links 4, which can pivot relative to one another about axes perpendicular to the pivoting axes of chain links 3 and parallel to each other. The right and middle sections are connected by one chain link 1 such that its pin 25, which is integrally molded on center web 13, engages opening 36 integrally molded in center web 15 of adjacent chain link 3 and pins 40 on side elements 11 and 12 of adjacent chain link 4 engage openings 23 and 24 in side elements 5 and 6 of intermediate chain link 1.

The nature of chain links 3 in the middle section and their connection to the chain links of the right and left sections are shown particularly clearly in FIG. 6, in which chain links 3 and chain link 1, which connects them to chain links 4, are shown in a partially cut-away view.

FIGS. 5 and 6 show that, given the universal options for assembling an energy guiding chain from chain links 1, 2, 3 and 4, the split outside webs for inserting and removing the lines are arranged continuously on opposite sides of the chain. The various chain links 1, 2, 3 and 4 form a uniform configuration.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. An energy guiding chain comprising:
a plurality of chain links including at least first and second chain links, the first and second chain links having at least one open end face and two opposing side elements, the plurality of chain links being connected to one another in an articulated fashion, wherein the first and second chain links include a first connector on one of the side elements for articulated connection to the other of the first and second chain links adjacent to at least one of the open end faces of the first and second chain links, the first and second chain links being pivotally connected about a first axis transverse to a longitudinal direction of the energy guiding chain, the side elements of the first and second chain links being connected by a center web, the first and second chain links also including openable outside webs, the center web of both the first and second chain links including a second connector for articulated connection to a third chain link, the third chain link connected to one of the first and second chain links at an opposite end face from the connection between the first and second chain links, the first and second chain links pivotally connectable to the third chain link about a second axis that is perpendicular to the first axis and transverse to the longitudinal direction of the energy guiding chain, the third chain link also including a center web and openable outside webs, the openable outside webs of the third chain link are located on the same sides of the energy guiding chain as the openable side webs of the first and second chain links.

2. The energy guiding chain according to claim 1, wherein the openable outside webs of the first, second, third and other chain links are integrally molded on the side elements and have central openings.

3. The energy guiding chain according to claim 1, wherein the side elements of the first and second chain links include an inwardly cranked strap section and an outwardly cranked strap section, the openable outside webs extend between the outwardly cranked strap sections of the opposing side elements of the first and second chain links.

4. The energy guiding chain according to claim 3, wherein the center web of the first chain link extends between the inwardly cranked strap sections of the opposing side elements of the first chain link and the first connector is located on the outwardly cranked strap sections of the first chain link.

5. The energy guiding chain according to claim 4, wherein the first connector of the first chain link is comprised of openings in the outwardly cranked strap sections and the second connector of the first chain link is comprised of a pin integrally molded on the center web of the first chain link.

6. The energy guiding chain according to claim 4, wherein the center web of the second chain link extends between the outwardly cranked strap sections of the opposite side elements of the second chain link and the first connector of the second chain link is located on the inwardly cranked strap sections of the second chain link.

7. The energy guiding chain according to claim 6, wherein the first connector of the second chain link is comprised of pins integrally molded on the opposing side elements of the second chain link that extend from inside the energy guiding chain towards an outside of the energy guiding chain, and the second connector of the second chain link is comprised of an opening in the center web of the second chain link.

8. The energy guiding chain according to claim 6 wherein the first and second connectors of the first and second chain links form an articulated connection about the first and second axis.

9. The energy guiding chain according to claim 8, wherein opposing sides of the energy guiding chain formed by the opposing side elements of the first and second chain links upon connection of the first and second chain links are essentially closed in every pivoting position, the outwardly cranked strap sections of the first chain link overlap the inwardly cranked strap sections of the second chain link when the first and second chain links are connected.

10. The energy guiding chain according to claim 8, wherein the inwardly cranked strap sections of the second chain link have projections protruding from their end faces facing in the longitudinal direction of the energy guiding chain that engage pockets in the first chain link when the first and second chain links are connected to form a pivoting connection about the first axis, the pockets of the first chain link being located on an inner face of the outwardly cranked strap sections of the first chain link.

11. The energy guiding chain according to claim 10, wherein the projections of the second chain link act as stops, which interact with stop surfaces on an inside of the pockets of the first chain link to limit a pivoting angle between the first and second chain links in both pivoting directions about the first axis.

12. The energy guiding chain according to claim 10, wherein the inwardly cranked strap sections of the first chain link include first slots adjacent a root end of the center web of the first chain link on the end faces of the first chain link facing in the longitudinal direction of the energy guiding chain, the slots engage the center web of the second chain link when the first and second chain links are engaged adjacent the inwardly cranked strap sections of the first chain link and the outwardly cranked strap sections of the second chain link and the center web of the second chain link includes a second slot adjacent a root end of the center web of the second chain link that engages one of the end faces of the inwardly cranked sections of the first chain link, the first and second slots limit pivoting angles between the first and second chain links in both directions about the second axis when the first and second chain links are connected adjacent the inwardly cranked sections of the first chain link and the outwardly cranked sections of the second chain link.

13. The energy guiding chain according to claim 8 wherein the third chain link includes a center web, the center web of the third chain link includes a pair of connectors adjacent to its end faces for connection to another connector, connection of the connector of the third chain link with another connector permitting pivotal movement about an axis perpendicular to the center web of the third chain link between the connectors of the third chain link and the other connector.

14. The energy guiding chain according to claim 13, wherein the center web of the third chain link includes a first web segment stepped to one side in relation to a second web segment, the first web segment includes an opening connector and the second web segment includes a pin connector, which is integrally molded on a side surface of the second web segment towards which the first web segment is stepped.

15. The energy guiding chain according to claim 14, wherein the third chain link includes side elements comprised on an inwardly cranked strap section and an outwardly cranked strap section.

16. The energy guiding chain according to claim 8, further comprising at least a fourth chain link that includes opposing side elements, each of the opposing side elements of the fourth chain link include a connector for articulated connection to an adjacent chain link, connection of the connectors of the fourth chain link to another connector permits pivotal movement about an axis transverse to the longitudinal direction of the energy guiding chain and parallel to a center web of the fourth chain link.

17. The energy guiding chain according to claim 16, wherein the side elements of the fourth chain link are comprised of inwardly cranked strap sections and outwardly cranked strap sections.

\* \* \* \* \*